US011218666B1

(12) United States Patent
Haas et al.

(10) Patent No.: US 11,218,666 B1
(45) Date of Patent: Jan. 4, 2022

(54) ENHANCED AUDIO AND VIDEO CAPTURE AND PRESENTATION

(71) Applicant: Amazon Technologies, Inc., Seattle, WA (US)

(72) Inventors: Bertrand Haas, Seattle, WA (US); Layne Christopher Price, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/119,074

(22) Filed: Dec. 11, 2020

(51) Int. Cl.
H04N 7/14 (2006.01)
G06K 9/00 (2006.01)
G10L 15/183 (2013.01)
G06T 13/20 (2011.01)
H04N 7/15 (2006.01)
G10L 15/00 (2013.01)
G06T 13/40 (2011.01)

(52) U.S. Cl.
CPC ......... H04N 7/147 (2013.01); G06K 9/00302 (2013.01); G06K 9/00355 (2013.01); G06T 13/205 (2013.01); G06T 13/40 (2013.01); G10L 15/005 (2013.01); G10L 15/183 (2013.01); H04N 7/157 (2013.01)

(58) Field of Classification Search
CPC ........... G06K 9/00; G06T 13/40; G06T 13/20; G10L 15/00; G10L 15/183

USPC ............................................ 348/14.01–14.16
See application file for complete search history.

(56) References Cited

U.S. PATENT DOCUMENTS

2004/0207720 A1* 10/2004 Miyahara ......... H04N 21/41407
348/14.02
2008/0151786 A1* 6/2008 Li ......................... H04L 65/607
370/276
2013/0257877 A1* 10/2013 Davis ..................... G06N 3/006
345/473
2015/0058023 A1* 2/2015 Goo ...................... G10L 15/005
704/277
2017/0308905 A1* 10/2017 Navaratnam .......... G06Q 30/02
2019/0348027 A1* 11/2019 Berenzweig .......... G10L 15/063
2020/0226830 A1* 7/2020 Kaehler ................. G06T 13/40

* cited by examiner

Primary Examiner — Melur Ramakrishnaiah
(74) Attorney, Agent, or Firm — Eversheds Sutherland (US) LLP

(57) ABSTRACT

Devices, systems, and methods are provided for audio and video capture and presentation. A method may include receiving, by a first device, images of a user, identifying, in a first image of the images, a first expression of the user, and identifying, in a second image of the images, a second expression of the user. The method may include determining that the first expression is associated with a first phoneme and that the second expression is associated with a second phoneme. The method may include generating audio including the first phoneme and the second phoneme, and sending the audio to a second device for presentation.

20 Claims, 9 Drawing Sheets

ENHANCED AUDIO AND VIDEO CAPTURE AND PRESENTATION

BACKGROUND

People increasingly are using devices to communicate, such as in virtual meetings, gaming, and other messaging applications. Microphones that detect audio, such as a person's speech, also may capture ambient noise that, when presented to a viewer or listener, may render the person's speech difficult to hear or understand. In addition, the streaming of video and audio of a person speaking or gesturing, even when encoded, may result in data loss and may require too much bandwidth, sometimes resulting in lag or freezing, undermining user experience. There is therefore a need for enhanced capture and presentation of audio and video.

Figure 1:
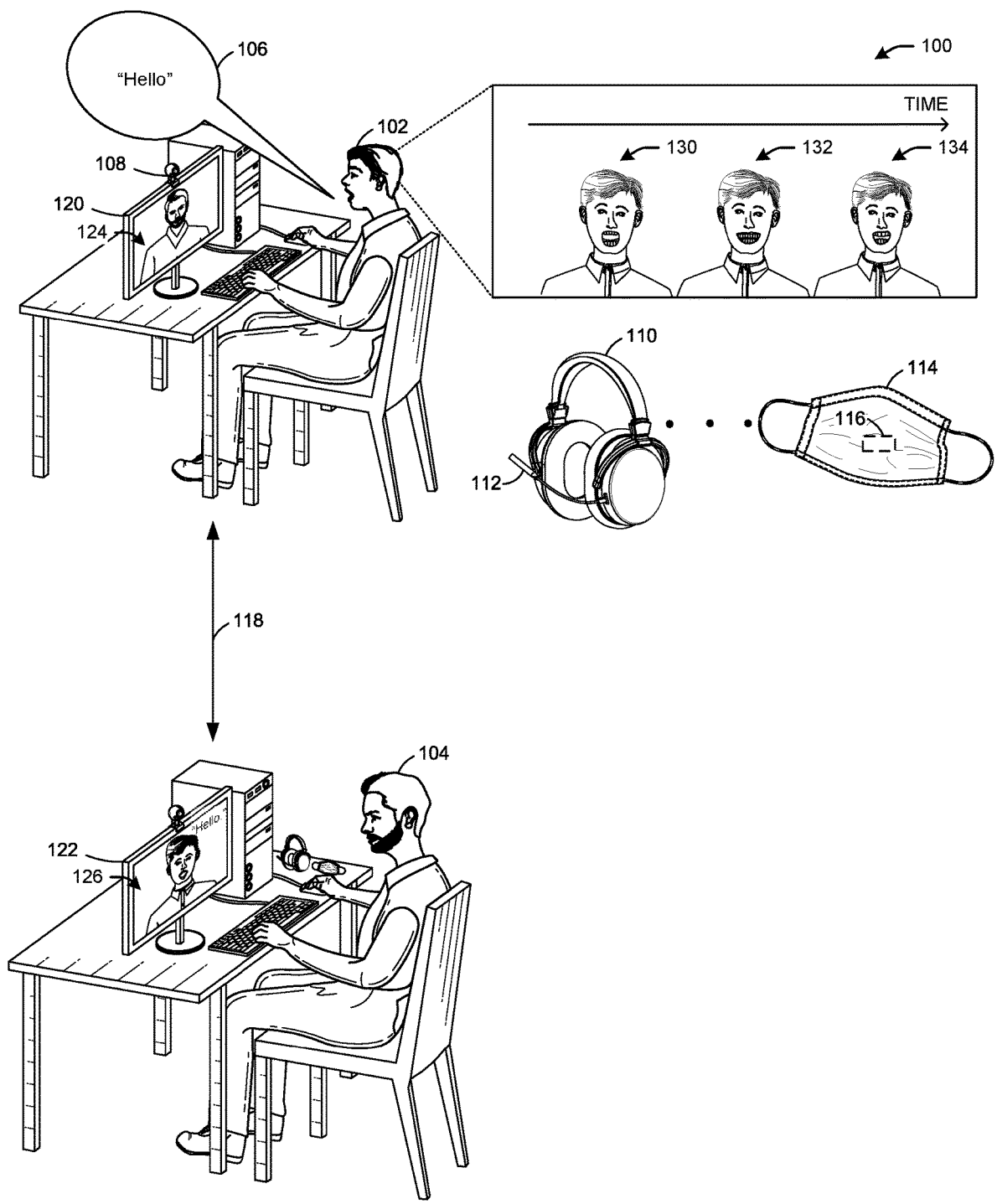
FIG. 1 illustrates an example system for audio and video capture and presentation, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for audio and video capture and presentation.

Devices that detect audio, such as a person's speech, also may capture ambient noise or muffled sounds (e.g., when a person speaking is wearing a mask) that, when presented to a viewer or listener, may render the person's speech difficult to hear or understand. Ambient noise filtering may be inefficient or inaccurate, undermining a listener's ability to hear or understand the audio. For example, a person may be wearing headphones while speaking, and may not realize that a microphone is capturing both the person's voice and ambient noise. In this manner, while the person speaking does not hear the ambient noise, another person listening to the person's voice on another device (e.g., in a video conference) may be presented with the detected ambient noise.

In addition, when captured video and audio of a user communicating to another user (e.g., in a virtual meeting) is transmitted, the video and audio may use a significant amount of bandwidth even when encoded, allowing for lag, freezing, skipping, and other defects that undermine user experience. Also, a person whose voice, expressions, and gestures are being captured in audio and video form may not wish for every sound, word, gesture, or expression to be presented to another person. For example, one participant in a video conference may want other participants in the video conference to see some gestures (e.g., sign language, hand signals, etc.), but not others (e.g., a scratch of the face).

There is therefore a need for enhanced audio and video capture and presentation.

In one or more embodiments, detected audio and video (e.g., detected with user consent and in compliance with relevant laws and regulations) may be analyzed to determine corresponding words being spoken or gestured, and the corresponding phonemes of those words. For example, audio of a person speaking may include individual phonemes of the words being spoken. Video images of the person speaking or gesturing may correspond to words and the phonemes of the words. When video images show a person's face (e.g., lips) while speaking, image analysis techniques may allow for an identification of a facial expression in individual frames of video, and the facial expression may match a known facial expression that a person makes when saying a phoneme. For example, a facial expression (e.g., the mouth/lip position) of a person pronouncing "o" may be different than a facial expression of a person pronouncing "e," "th," "r," etc. When video images show a person gesturing, such as using sign language, image analysis techniques may allow for identification of signs based on the person's movements and hand positions, and the words that correspond to the signs may correspond to phonemes that a person might hear if the words were spoken instead of signed. In this manner, spoken words may be translated into gestures, and gestures may be translated into audio phonemes and corresponding images of a person's face pronouncing the phonemes.

In one or more embodiments, some devices may be equipped with a microphone and/or image capture device (e.g., a camera) to capture audio and/or video of a person. The devices may include or have access to a machine learning (ML) model, such as a deep neural network, that may perform image analysis and audio analysis to identify people, faces, gestures, facial expressions, and sounds. Using a combination of audio and video, the ML model may identify specific phonemes represented by the audio and/or video captured by the devices.

In one or more embodiments, based on the phonemes represented by the audio and/or video captured by the devices, the devices may generate audio and video representations of the captured audio and video (e.g., not simply encoded versions of the captured audio and video) to stream to other devices for presentation. The generated audio and video may be based on user consent and in compliance with relevant laws and regulations (e.g., to prevent one person from being represented as another person and/or to prevent a person from being presented in a way that the person has not consented to or that is non-compliant with any relevant law or regulation). For example, the video may include an avatar or other representation of the user (e.g., a pre-selected image of the user) whose audio and video is captured, adapted to show the facial expressions of the identified phonemes (e.g., to create a representation of what the person's face looks like while speaking the identified words of the audio). In this manner, a person may control the way that they appear to someone else, and which words and/or gestures to present to another person. The generated video for presentation also may include gestures that correspond to the spoken words identified in the captured audio, which may be presented using the avatar or other representation of the user. The generated audio may include at least some of the phonemes identified in the captured audio, using either a synthetic voice, or a generated voice adapted to sound similar to the user's captured voice. The generated audio and video may exclude certain sounds and images, such as sounds corresponding to ambient noise or words that are to be filtered out (e.g., based on identified keywords in the audio or video, or based on user preferences). In this manner, the audio and video presented to a first user may be different than the actual audio and video of a second user that was captured and used to generate the audio and video presented to the first user, and because of the audio and video representations presented, may reduce bandwidth requirements for the streaming of the audio and video. The generated video also may include a default image or set of images to display when a user is not talking or gesturing (e.g., to show the user looking at a screen and appearing to pay attention to someone else talking or gesturing). The generated audio also may be used by the model to generate (e.g., using natural language processing) a textual transcript of at least some of the words identified in captured audio (or corresponding to gestures captured in video images).

In one or more embodiments, when both captured audio and video of a person is available, the ML model may determine a confidence level for any phoneme identified using the audio or video. For example, when there is minimal background noise, the ML model may identify phonemes of captured audio with high confidence levels and may not need video with which to analyze corresponding facial expressions to confirm whether a phoneme identified from audio corresponds to a known facial expression associated with the phoneme. However, when the confidence level of a phoneme identified in audio is too low (e.g., below a confidence threshold due to noise), the model may determine whether a facial expression in captured video corresponding to the same time as the phoneme identified in the audio is the same as the identified phoneme from the audio. If so, the identified phoneme may be confirmed and used to generate the audio and/or video for presentation. If not, the model may determine whether the phoneme identified in the audio or the phoneme identified in the video has a higher confidence level, and may use the phoneme with the higher confidence level to generate the audio and/or video for presentation.

In one or more embodiments, the model may allow for presentation of audio and video in multiple languages, even when captured audio is captured in one language and presentation is to be in another language. For example, the model may identify corresponding phonemes from audio and video as described above, and may determine the corresponding phonemes and facial expressions in another language based on the words to which the phonemes correspond. For example, a person saying the word "bread" in English may correspond to a "br" sound and facial expression, and once the word is translated to the word "pain" in French, the "br" sound and facial expression may be translated to a "p" sound and facial expression used to generate the audio and/or video to be presented in French. In particular, a device may identify from images and/or audio the words that a person is speaking and/or gesturing. Using natural language processing, the device may covert the words to text in one language and translate the text into one or more other languages (e.g., by converting multiple words or sentences at a time). The device may convert the translated text to phonemes to be used when generating representative images and/or audio of a person communicating the phonemes in any translated language.

In one or more embodiments, the model may learn facial expressions and sounds of a user. Over time, the model may adjust images of the user's (or user's avatar's) face to show the user (or user's avatar) expressing individual phonemes in a way that looks closer to the user's actual expressions. Similarly, the model may adjust phoneme sounds to be presented to sound more like the user's voice, allowing the presented audio of a user speaking to sound more like the user's actual voice.

In one or more embodiments, the generated audio and/or video image representations of one user that are presented to another user may be based on user preferences, user location, machine learning, and the like. For example, a user preference may indicate that a user prefers to use an avatar or other image of the user (e.g., provided before the capture and generation of audio and/or images), that the user prefers to use the user's voice (e.g., pre-recorded) to generate the audio representation, that the user prefers to show or see any combination of images and/or video, that the user prefers to show or not show gestures or facial expressions corresponding to certain words (e.g., curse words), that the user prefers to show or not show gestures or facial expressions that do not correspond to a word (e.g., a gesture such as scratching one's face, a sound that is not part of a word, such as a cough or sneeze, etc.), the language(s) that a user prefers to use when presenting the audio and/or images, and the like.

In one or more embodiments, the ML model may identify speech, gestures, and emotions based on any combination of images and/or audio. For example, the ML model may determine a tone, valence, and/or intensity of captured audio and/or by identifying facial expressions and/or gestures to determine a person's emotion (e.g., excited, happy, sad, angry, etc.). In this manner, when generating representative images and/or audio of a user speaking and/or gesturing, the tone or intensity may be selected to match the identified tone or intensity of captured audio and/or images. In a similar manner, the generated images of the user speaking may use facial expressions and/or gestures that represent the person's tone or intensity (e.g., using more or less pronounced facial expressions and/or gestures, etc.). For example, emotions of a user may be reflected in movements of the user's head, eyes, eyebrows, and mouth. The information transmitted for presentation may include phonemes and/or emotions. The emotions may be transmitted when a connection metric satisfies connection criteria (e.g., a received strength signal indicator), and excluded from transmission when the connection criteria is not satisfied. When the connection criteria is satisfied, a representation of the user's voice may be used for generated audio, but when the connection criteria is not satisfied, a synthetic voice may be used for the generated audio.

In one or more embodiments, the representative avatar of the user for the generated images may be based on a multi-dimensional model of the user's face. The user may alter the avatar or may provide a customized image or avatar with which the system may generate the representative images of the user.

In one or more embodiments, the system may generate text (e.g., closed captions) to present along with or alternative to images and/or audio of the user. When the ML model identifies phonemes and corresponding words, the ML model may facilitate the transcribing of the words into text that may be included in the presentation to another user.

In one or more embodiments, the device that detects a first person's audio and/or images may provide indications of the corresponding phonemes (e.g., identified as described herein) to a receiving device (e.g., of a second person to be presented with a representation of the first person). In this manner, instead of the first user's device generating representative audio and/or images of the first user and sending the representative audio and/or images of the first user to the second user's device for presentation, the first user's device may provide indications of the identified phonemes to the second user's device, and the second user's device may generate the representative audio and/or images of the first user for presentation. Whether the representative audio and/or images of the first user are sent to the second person's device or the phonemes are sent to the second user's device to generate the representative audio and/or images of the first user may be based on user preferences, connection criteria (e.g., whether bandwidth exceeds a threshold bandwidth, whether signal strength exceeds a threshold signal strength, etc.).

In one or more embodiments, the analysis of images and/or audio to identify phonemes may include identifying a user in the images and/or audio. For example, an image may include multiple users. To identify the user who is to be analyzed for identifying phonemes, the image analysis may identify recognized users, users closest to a camera, etc., and use their expressions for identifying the phonemes. When captured audio includes multiple voices, the voice analyzed for identifying the phonemes may be based on a match with an existing user's voice, the loudest user's voice, or a user selection.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example system 100 for audio and video capture and presentation, in accordance with one or more example embodiments of the present disclosure.

Referring to FIG. 1, the system 100 may include a first user 102 communicating with a second user 104 (e.g., using a video messaging session, meeting, etc.). Voice utterances 106 (e.g., words spoken and sounds made by the first user 102) and images of the first user 102 may be captured by one or more devices, such as a camera 108, a headset 110 with a microphone and/or camera 112, a facemask 114 with a microphone and/or camera 116, and the like. Captured audio and video of the first user 102 and/or the second user 104 may be converted into generated audio and/or video 118 to be presented using one or more devices, such as a display 120 and a display 122 for the respective users (e.g., allowing the first user 102 to see and/or hear a representation 124 of the second user 104, and the second user 104 to see and/or hear a representation 126 of the first user 102). For example, as the first user 102 speaks, individual phonemes spoken by the first user 102 may correspond to facial expressions that a person makes when expressing the phoneme. As shown in FIG. 1, the first user 102 may express a first phoneme 130 at a first time, a second phoneme 132 at a second time, a third phoneme 134 at a third time, and so on. Any of the camera 108, the headset 110, the facemask 114, and/or the display 120 may detect images and/or audio of the first user 102 expressing the different phonemes, and may generate images and/or audio (e.g., the representation 126 of the first user 102) to be presented to the second user 104, and vice versa.

Figure 2:
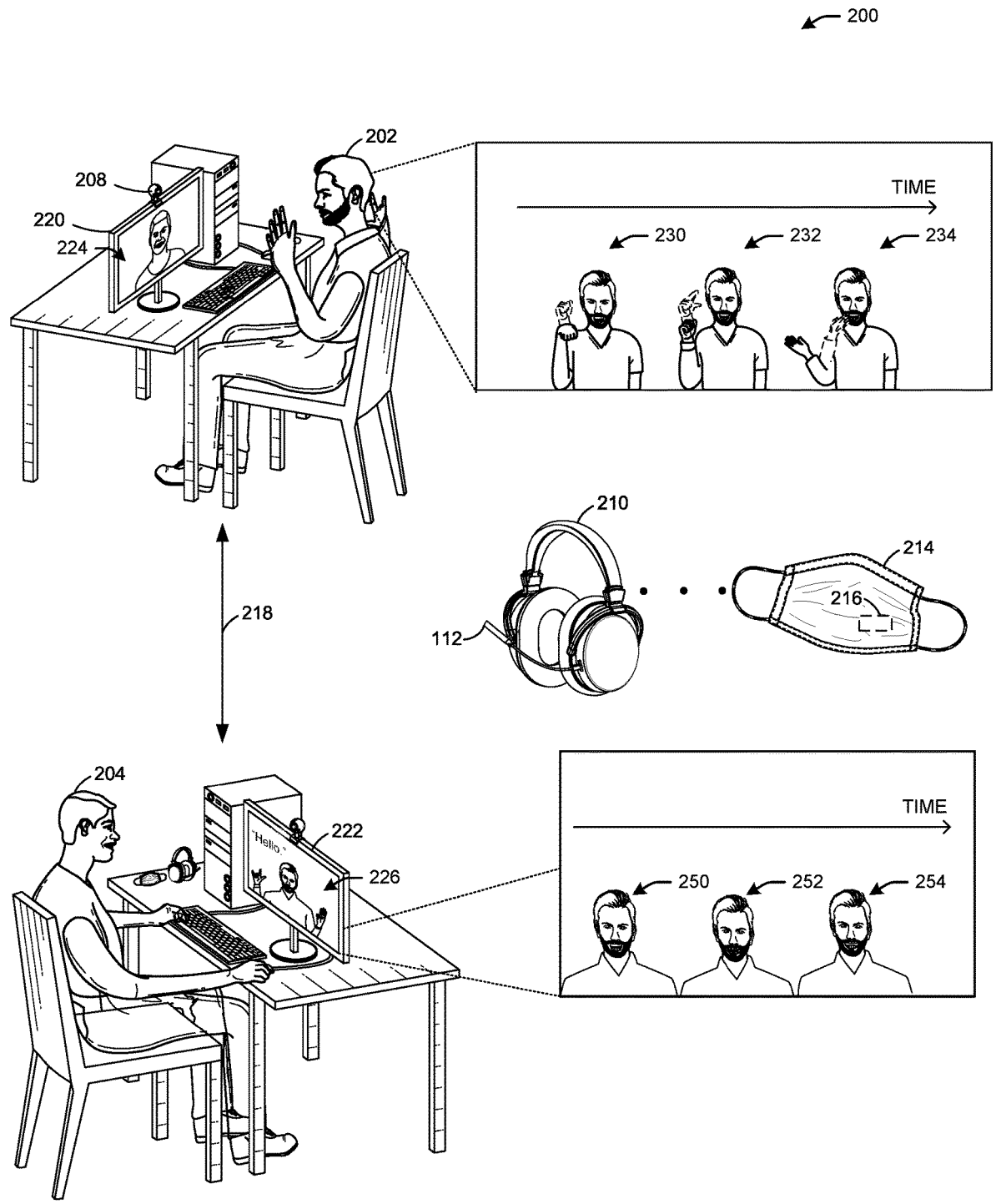
FIG. 2 illustrates an example system for audio and video capture and presentation, in accordance with one or more example embodiments of the present disclosure.

In one or more embodiments, detected audio and video may be analyzed to determine corresponding words being spoken or gestured, and the corresponding phonemes of those words. For example, audio of the first user 102 speaking (e.g., the voice utterances 106) may include individual phonemes of the words being spoken (e.g., the first phoneme 130, the second phoneme 132, the third phoneme 134). Video images of the first user 102 speaking and/or gesturing (e.g., as shown in FIG. 2) may correspond to words and the phonemes of the words. When video images show the face (e.g., lips) of the first user 102 while speaking, image analysis techniques may allow for an identification of a facial expression in individual frames of video, and the facial expression may match a known facial expression that a person makes when saying a phoneme.

Figure 3:
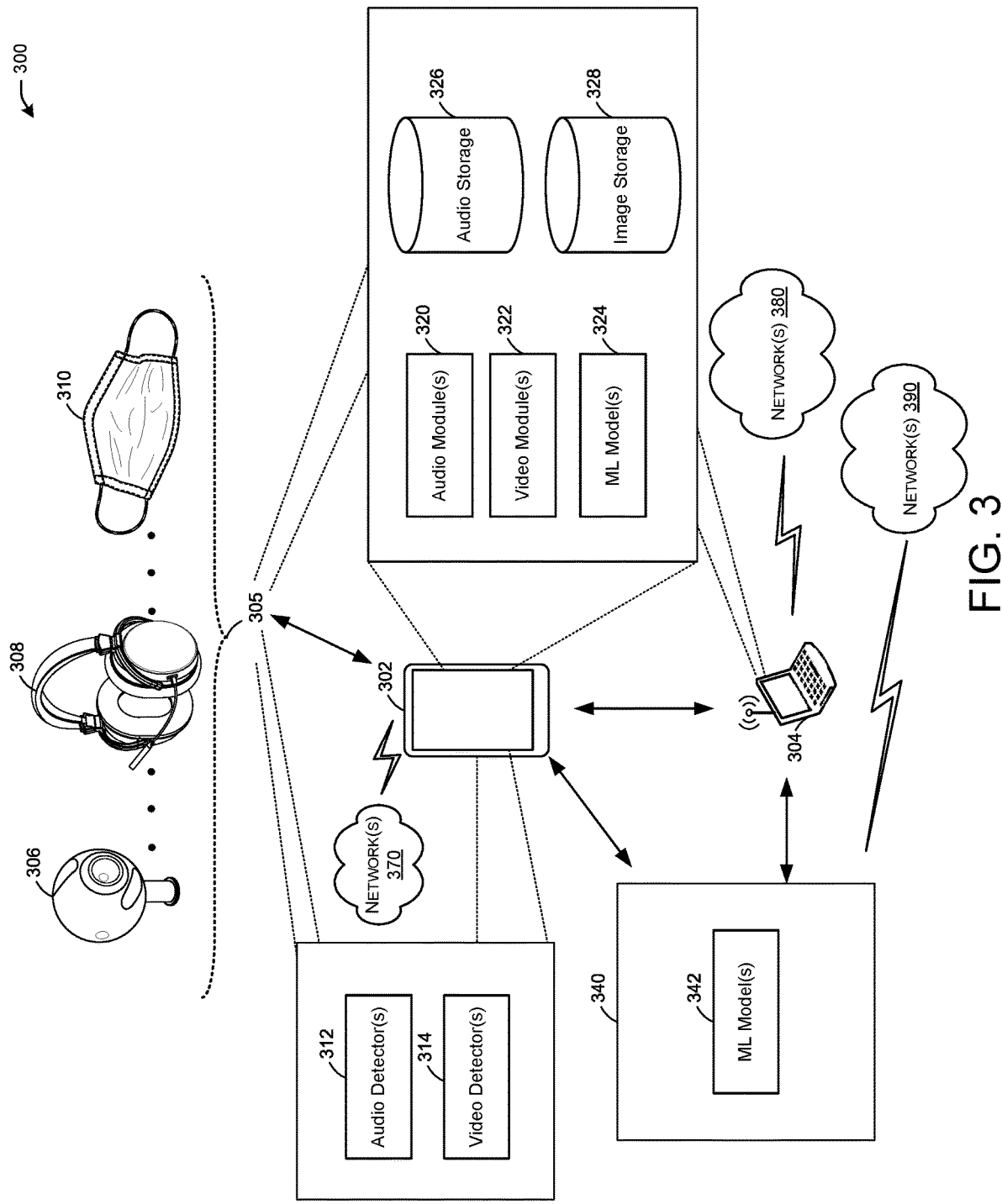
FIG. 3 illustrates an example system for audio and video capture and presentation, in accordance with one or more example embodiments of the present disclosure.

In one or more embodiments, some devices (e.g., any of the camera 108, the headset 110, the facemask 114, and/or the display 120) may be equipped with a microphone and/or image capture device (e.g., a camera) to capture audio and/or video of a person. The devices may include or have access to a ML model, such as a deep neural network, that may perform image analysis and audio analysis to identify people, faces, gestures, facial expressions, and sounds. Using a combination of audio and video, the ML model (e.g., as shown in FIG. 3) may identify specific phonemes represented by the audio and/or video captured by the devices.

In one or more embodiments, based on the phonemes represented by the audio and/or video captured by the devices, the devices (e.g., any of the camera 108, the headset 110, the facemask 114, and/or the display 120) may generate audio and video representations of the captured audio and video (e.g., not simply encoded versions of the captured audio and video) to stream to other devices for presentation. For example, the representation 126 of the first user 102 presented to the second user 104 may include an avatar or other representation of the first user 102 (e.g., a pre-selected image of the first user 102) whose audio and video is captured, adapted to show the facial expressions of the identified phonemes (e.g., to create a representation of what the person's face looks like while speaking the identified words of the audio). The representation 126 of the first user 102 also may include gestures (e.g., as shown in FIG. 2) that correspond to the spoken words identified in the captured audio, which may be presented using the representation 126 of the first user 102. The generated audio of the first user 102 may include at least some of the phonemes identified in the captured audio (e.g., the first phoneme 130, the second phoneme 132, the third phoneme 134), using either a synthetic voice, or a generated voice adapted to sound similar to the first user's captured voice. The generated audio and video may exclude certain sounds and images, such as sounds corresponding to ambient noise or words that are to be filtered out (e.g., based on identified keywords in the audio or video, or based on user preferences). In this manner, the audio and video presented to the second user 104 may be different than the actual audio and video of the first user 102 that was captured and used to generate the audio and video presented to the second user 104, and because of the representation 126 presented, may reduce bandwidth requirements for the streaming of the generated audio and video 118. The generated video also may include a default image or set of images to display when a user is not talking or gesturing (e.g., to show the user looking at a screen and appearing to pay attention to someone else talking or gesturing). The generated audio also may be used by the model to generate (e.g., using natural language processing) a textual transcript of at least some of the words identified in captured audio (or corresponding to gestures captured in video images).

In one or more embodiments, when both captured audio and video of a person is available, the ML model may determine a confidence level for any phoneme (e.g., the first phoneme 130, the second phoneme 132, the third phoneme 134) identified using the audio or video. For example, when there is minimal background noise, the ML model may identify phonemes of captured audio with high confidence levels and may not need video with which to analyze corresponding facial expressions to confirm whether a phoneme identified from audio corresponds to a known facial expression associated with the phoneme. However, when the confidence level of a phoneme identified in audio is too low (e.g., below a confidence threshold due to noise), the model may determine whether a facial expression in captured video corresponding to the same time as the phoneme identified in the audio is the same as the identified phoneme from the audio. If so, the identified phoneme may be confirmed and used to generate the audio and/or video for presentation (e.g., the representation 126 and/or the representation 124). If not, the model may determine whether the phoneme identified in the audio or the phoneme identified in the video has a higher confidence level, and may use the phoneme with the higher confidence level to generate the audio and/or video for presentation.

In one or more embodiments, the model may allow for presentation of audio and video in multiple languages, even when captured audio is captured in one language and presentation is to be in another language. For example, the model may identify corresponding phonemes (e.g., the first phoneme 130, the second phoneme 132, the third phoneme 134) from audio and video as described above, and may determine the corresponding phonemes and facial expressions in another language based on the words to which the phonemes correspond.

In one or more embodiments, the model may learn facial expressions and sounds of a user. Over time, the model may adjust images of the user's (or user's avatar's) face to show the user (or user's avatar) expressing individual phonemes in a way that looks closer to the user's actual expressions. Similarly, the model may adjust phoneme sounds to be presented to sound more like the user's voice, allowing the presented audio of a user speaking to sound more like the user's actual voice.

The camera 108, the headset 110, the facemask 114, the display 120, and/or the display 122 may include any suitable processor-driven device including, but not limited to, a mobile device or a non-mobile, e.g., a static, device. For example, the camera 108, the headset 110, the facemask 114, the display 120, and/or the display 122 may include a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, or the like. It is understood that the above is an example list of devices that is not meant to be limiting.

FIG. 2 illustrates an example system 200 for audio and video capture and presentation, in accordance with one or more example embodiments of the present disclosure.

Referring to FIG. 2, the system 200 may include a first user 202 communicating with a second user 204 (e.g., using a video messaging session, meeting, etc.). Sounds (e.g., the voice utterances 106 of FIG. 1) and/or images of the first user 202 may be captured by one or more devices, such as a camera 208, a headset 210 with a microphone and/or camera 212, a facemask 214 with a microphone and/or camera 216, and the like. Captured audio and video of the first user 202 and/or the second user 204 may be converted into generated audio and/or video 218 to be presented using one or more devices, such as a display 220 and a display 222 for the respective users (e.g., allowing the first user 202 to see and/or hear a representation 224 of the second user 204, and the second user 204 to see and/or hear a representation 226 of the first user 202). For example, as the first user 202 gestures (e.g., using sign language and/or other gestures), individual gestures performed by the first user 202 may correspond to words, phonemes, and facial expressions that a person makes when expressing the phonemes. As shown in FIG. 2, the first user 202 may perform a first gesture 230 at a first time, a second gesture 232 at a second time, a third gesture 234 at a third time, and so on. Any of the camera 208, the headset 210, the facemask 214, and/or the display 220 may detect images and/or audio of the first user 202 performing the different phonemes and/or making sounds/utterances, and may generate images and/or audio (e.g., the representation 226 of the first user 202) to be presented to the second user 204, and vice versa.

In one or more embodiments, detected audio and video may be analyzed to determine corresponding words being spoken or gestured, and the corresponding phonemes of those words. For example, audio of the first user 202 speaking (e.g., the voice utterances 106 of FIG. 1) may include individual phonemes of the words being spoken (e.g., the first phoneme 130, the second phoneme 132, the third phoneme 134 of FIG. 1). Video images of the first user 202 speaking and/or gesturing (e.g., the images of the phonemes in FIG. 1 and/or the first gesture 230, the second gesture 232, the third gesture 234, etc.) may correspond to words and the phonemes of the words. When video images show the first user 102 gesturing and/or speaking, image analysis techniques may allow for an identification of a facial expression in individual frames of video, and the facial expression may match a known facial expression that a person makes when saying a phoneme. In particular, when a gesture corresponds to a known sign language gesture and therefore one or more words, the phonemes of the one or more words may correspond to facial expressions that a person may express if they were to mouth or pronounce the one or more words. In this manner, the generated audio and/or video 218 may include images representing the first user 202 performing gestures, speaking the words corresponding to the gestures (e.g., even when the captured images of the first user 202 do not include the first user 202 speaking or mouthing the words), and/or audio the represents the first user 202 or a synthetic voice speaking the words that correspond to the gestures. As shown in FIG. 2, the representation 226 of the first user 202 that is presented to the second user 204 may include video images of the second user 202 (e.g., an avatar of the second user 202) performing gestures and/or expressing phonemes of any words corresponding to the gestures (e.g., using a first facial expression 250, a second facial expression 252, a third facial expression 254, and so on).

In one or more embodiments, some devices (e.g., any of the camera 208, the headset 210, the facemask 214, and/or the display 220) may be equipped with a microphone and/or image capture device (e.g., a camera) to capture audio and/or video of a person. The devices may include or have access to a ML model, such as a deep neural network, that may perform image analysis and audio analysis to identify people, faces, gestures, facial expressions, and sounds. Using a combination of audio and video, the ML model (e.g., as shown in FIG. 3) may identify specific phonemes represented by the audio and/or video captured by the devices.

In one or more embodiments, based on the phonemes represented by the audio and/or video captured by the devices, the devices (e.g., any of the camera 208, the headset 210, the facemask 214, and/or the display 220) may generate audio and video representations of the captured audio and video (e.g., not simply encoded versions of the captured audio and video) to stream to other devices for presentation. For example, the representation 226 of the first user 202 may include gestures (e.g., the first gesture 230, the second gesture 232, the third gesture 234, etc.), which may be presented using the representation 226 of the first user 202. Some of the gestures may correspond to words, so the representation 226 may include audio of a person speaking the words and/or video images of the first user 202 (e.g., an avatar of the first user 202) speaking the words (e.g., using the first facial expression 250, the second facial expression 252, the third facial expression 254, and so on). The generated audio of the first user 202 may include at least some of the phonemes identified in captured audio (e.g., the first phoneme 130, the second phoneme 132, the third phoneme 134 of FIG. 1) and/or phonemes corresponding to words represented by identified gestures, and the generated audio may be presented to the second user 204 using either a synthetic voice, or a generated voice adapted to sound similar to the first user's captured voice. The generated audio and video 218 may exclude certain sounds and images, such as sounds corresponding to ambient noise or words that are to be filtered out (e.g., based on identified keywords in the audio or video, or based on user preferences). In this manner, the audio and video presented to the second user 204 may be different than the actual audio and video of the first user 202 that was captured and used to generate the audio and video presented to the second user 204, and because of the representation 226 presented, may reduce bandwidth requirements for the streaming of the audio and video 218. The generated video also may include a default image or set of images to display when a user is not talking or gesturing (e.g., to show the user looking at a screen and appearing to pay attention to someone else talking or gesturing). The generated audio also may be used by the model to generate (e.g., using natural language processing) a textual transcript of at least some of the words identified in captured audio (or corresponding to gestures captured in video images).

In one or more embodiments, when both captured audio and video of a person is available, the ML model may determine a confidence level for any phoneme identified using the audio or video. For example, when there is minimal background noise, the ML model may identify phonemes of captured audio with high confidence levels and may not need video with which to analyze corresponding facial expressions to confirm whether a phoneme identified from audio corresponds to a known facial expression associated with the phoneme. However, when the confidence level of a phoneme identified in audio is too low (e.g., below a confidence threshold due to noise), the model may determine whether a facial expression in captured video corresponding to the same time as the phoneme identified in the audio is the same as the identified phoneme from the audio. If so, the identified phoneme may be confirmed and used to generate the audio and/or video for presentation (e.g., the representation 226 and/or the representation 224). If not, the model may determine whether the phoneme identified in the audio or the phoneme identified in the video has a higher confidence level, and may use the phoneme with the higher confidence level to generate the audio and/or video for presentation.

In one or more embodiments, the model may allow for presentation of audio and video in multiple languages, even when captured audio is captured in one language and presentation is to be in another language. For example, the model may identify corresponding phonemes from audio and video as described above, and may determine the corresponding phonemes and facial expressions in another language based on the words to which the phonemes correspond.

In one or more embodiments, the model may learn facial expressions and sounds of a user. Over time, the model may adjust images of the user's (or user's avatar's) face to show the user (or user's avatar) expressing individual phonemes in a way that looks closer to the user's actual expressions. Similarly, the model may adjust phoneme sounds to be presented to sound more like the user's voice, allowing the presented audio of a user speaking to sound more like the user's actual voice.

The camera 208, the headset 210, the facemask 214, the display 220, and/or the display 222 may include any suitable processor-driven device including, but not limited to, a mobile device or a non-mobile, e.g., a static, device. For example, the camera 208, the headset 210, the facemask 214, the display 220, and/or the display 222 may include a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, or the like. It is understood that the above is an example list of devices that is not meant to be limiting.

Referring to FIGS. 1 and 2, the identified phonemes from images and/or audio may be used to transcribe the corresponding words being communicated. For example, when the first user 102 says "Hello," the images and/or audio of the first user 102 may be used to determine, based on the identified phonemes, that the first user 102 said "Hello," and the images sent to the second user 104 may include text (e.g., captions) as shown.

Still referring to FIGS. 1 and 2, the identified phonemes may be sent from the first user to the second user, and the second user's device (e.g., the display 122 of FIG. 1, the display 222 of FIG. 2, or other devices such as cameras, headsets, etc. as shown) may generate the audio and/or video representations of the first user based on the phonemes in the manner described above.

FIG. 3 illustrates an example system 300 for audio and video capture and presentation, in accordance with one or more example embodiments of the present disclosure.

Referring to FIG. 3, the system 300 may include a device 302 communicating with a device 304 (e.g., similar to the display 120 communicating with the display 122 in FIG. 1 and to the display 220 communicating with the display 222 in FIG. 2 to facilitate a communication session, such as a virtual meeting, online messaging, in-game communications, and the like). The device 302 and/or the device 304 may include and/or be in communication with other devices 305, such as the camera 306 (e.g., similar to the camera 108 of FIG. 1 and the camera 208 of FIG. 2), a headset 308 (e.g., similar to the headset 110 of FIG. 1 and the headset 210 of FIG. 2), a facemask 310 (e.g., similar to the facemask 114 of FIG. 1 and the facemask 214 of FIG. 2) for capturing video images and/or audio of users (e.g., as shown in FIG. 1 and FIG. 2). Any of the device 302, the device 304, the camera 306, the headset 308, and/or the facemask 310 may include or be in communication with one or more audio detectors 312 (e.g., microphones) and/or video detectors 314 (e.g., cameras or other image sensors) for detecting images and/or sounds of users (e.g., as shown in FIG. 1 and FIG. 2).

Still referring to FIG. 3, any of the device 302, the device 304, the camera 306, the headset 308, and/or the facemask 310 may include or be in communication with audio modules 320, video modules 322, ML models 324 (e.g., using deep neural networks, convolutional networks, etc.), audio storage 326, and/or image storage 328. For example, the ML models 324 may analyze detected image and/or audio, identify phonemes and gestures, convert gestures to phonemes and vice versa, perform language translation, and the like. The image storage 328 may include user images, including facial expressions corresponding to phonemes in multiple languages, facial expressions not corresponding to phonemes, gestures corresponding to words in multiple languages, and/or gestures not corresponding to words. The audio storage 326 may include audio of users and/or synthetic voices with which to generate audio.

Still referring to FIG. 3, any of the device 302, the device 304, the camera 306, the headset 308, and/or the facemask 310 may be in communication with a remote network 340 (e.g., a cloud-based network) that may include or have access to ML models 342. Any of the device 302, the device 304, the camera 306, the headset 308, and/or the facemask 310 may provide image and/or audio data to the remote network 340 to allow the remote network 340 to fine-tune the ML models 342. The remote network 340 may provide the adjusted ML models 342 to any of the device 302, the device 304, the camera 306, the headset 308, and/or the facemask 310 (e.g., to replace/update the ML models 324).

In one or more embodiments, the ML models 324 may analyze detected audio and video to determine corresponding words being spoken or gestured, and the corresponding phonemes of those words. For example, audio of a person speaking (e.g., the utterances 106 of FIG. 1) may include individual phonemes of the words being spoken (e.g., the first phoneme 130, the second phoneme 132, the third phoneme 134 of FIG. 1, etc.). Video images of the person speaking or gesturing may correspond to words and the phonemes of the words. When video images show a person's face (e.g., lips) while speaking, image analysis techniques may allow for an identification of a facial expression in individual frames of video, and the facial expression may match a known facial expression that a person makes when saying a phoneme. (e.g., may match a known image in the image storage 328) When video images show a person gesturing, such as using sign language, image analysis techniques may allow for identification of signs based on the person's movements and hand positions, and the words that correspond to the signs may correspond to phonemes that a person might hear if the words were spoken instead of signed. In this manner, spoken words may be translated into gestures, and gestures may be translated into audio phonemes and corresponding images of a person's face pronouncing the phonemes. The individual phoneme sounds may be stored in the audio storage 326. Images of individual gestures may be stored in the image storage 328. Images of facial expressions corresponding to phonemes may be stored in the image storage 328. In this manner, when the ML models 324 identify gestures, phonemes, and/or facial expressions, the audio modules 320 may generate audio representations of a person expressing phonemes, and the video modules 322 may generate corresponding video representations of the person expressing phonemes and/or performing gestures (e.g., as shown in FIG. 1 and FIG. 2).

In one or more embodiments, based on the phonemes represented by the audio and/or video captured by any of the device 302, the device 304, the camera 306, the headset 308, and/or the facemask 310, any of the device 302, the device 304, the camera 306, the headset 308, and/or the facemask 310 (e.g., using the audio modules 320 and/or the video modules 322) may generate audio and video representations of the captured audio and video (e.g., not simply encoded versions of the captured audio and video) to stream to other devices for presentation. For example, the video may include an avatar or other representation of the user (e.g., a pre-selected image of the user) whose audio and video is captured, adapted to show the facial expressions of the identified phonemes (e.g., to create a representation of what the person's face looks like while speaking the identified words of the audio). The generated video for presentation also may include gestures that correspond to the spoken words identified in the captured audio, which may be presented using the avatar or other representation of the user. The generated audio may include at least some of the phonemes identified in the captured audio, using either a synthetic voice, or a generated voice adapted to sound similar to the user's captured voice. The generated audio and video may exclude certain sounds and images, such as sounds corresponding to ambient noise or words that are to be filtered out (e.g., based on identified keywords in the audio or video, or based on user preferences). In this manner, the audio and video presented to a first user may be different than the actual audio and video of a second user that was captured and used to generate the audio and video presented to the first user, and because of the audio and video representations presented, may reduce bandwidth requirements for the streaming of the audio and video. The generated video also may include a default image or set of images to display when a user is not talking or gesturing (e.g., to show the user looking at a screen and appearing to pay attention to someone else talking or gesturing). The generated audio also may be used by the model to generate (e.g., using natural language processing) a textual transcript of at least some of the words identified in captured audio (or corresponding to gestures captured in video images).

In one or more embodiments, when both captured audio and video of a person is available, the ML models 324 may determine a confidence level for any phoneme identified using the audio or video. For example, when there is minimal background noise, the ML models 324 may identify phonemes of captured audio with high confidence levels and may not need video with which to analyze corresponding facial expressions to confirm whether a phoneme identified from audio corresponds to a known facial expression (e.g., in the image storage 328) associated with the phoneme. However, when the confidence level of a phoneme identified in audio is too low (e.g., below a confidence threshold due to noise), the ML models 324 may determine whether a facial expression in captured video corresponding to the same time as the phoneme identified in the audio is the same as the identified phoneme from the audio. If so, the identified phoneme may be confirmed and used to generate the audio and/or video for presentation. If not, the ML models 324 may determine whether the phoneme identified in the audio or the phoneme identified in the video has a higher confidence level, and the phoneme with the higher confidence level may be used to generate the audio and/or video for presentation.

In one or more embodiments, the ML models 324 may allow for presentation of audio and video in multiple languages, even when captured audio is captured in one language and presentation is to be in another language. For example, the ML models 324 may identify corresponding phonemes from audio and video as described above, and may determine the corresponding phonemes and facial expressions in another language based on the words to which the phonemes correspond.

In one or more embodiments, the ML models 324 may learn facial expressions and sounds of a user. Over time, the model may adjust images of the user's (or user's avatar's) face to show the user (or user's avatar) expressing individual phonemes in a way that looks closer to the user's actual expressions. Similarly, the ML models 324 may adjust phoneme sounds to be presented to sound more like the user's voice, allowing the presented audio of a user speaking to sound more like the user's actual voice.

In one or more embodiments, instead of the device 302 or any of the devices 305 generating the audio and/or video representations based on identified phonemes, the device 302 or any of the devices 305 may send the phonemes to the device 304 to use in generating the audio and/or video representations based on the identified phonemes. In this manner, bandwidth may be conserved by sending the phonemes instead of larger sets of data such as the generated audio and/or video representations.

The device 302 and/or the other devices 305 may be configured to communicate via a communications network 370, the device 304 may be configured to communicate via a communications network 380, and/or the remote network 340 may be configured to communicate via a communications network 390, wirelessly or wired (e.g., the same or different wireless communications networks). The communications network 370, the communications network 380, and/or the communications network 390 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 370, the communications network 380, and/or the communications network 390 may have any suitable communication range associated therewith and may include, for example, global networks (e.g., the Internet), metropolitan area networks (MANs), wide area networks (WANs), local area networks (LANs), or personal area networks (PANs). In addition, communications network 370, the communications network 380, and/or the communications network 390 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 4A:
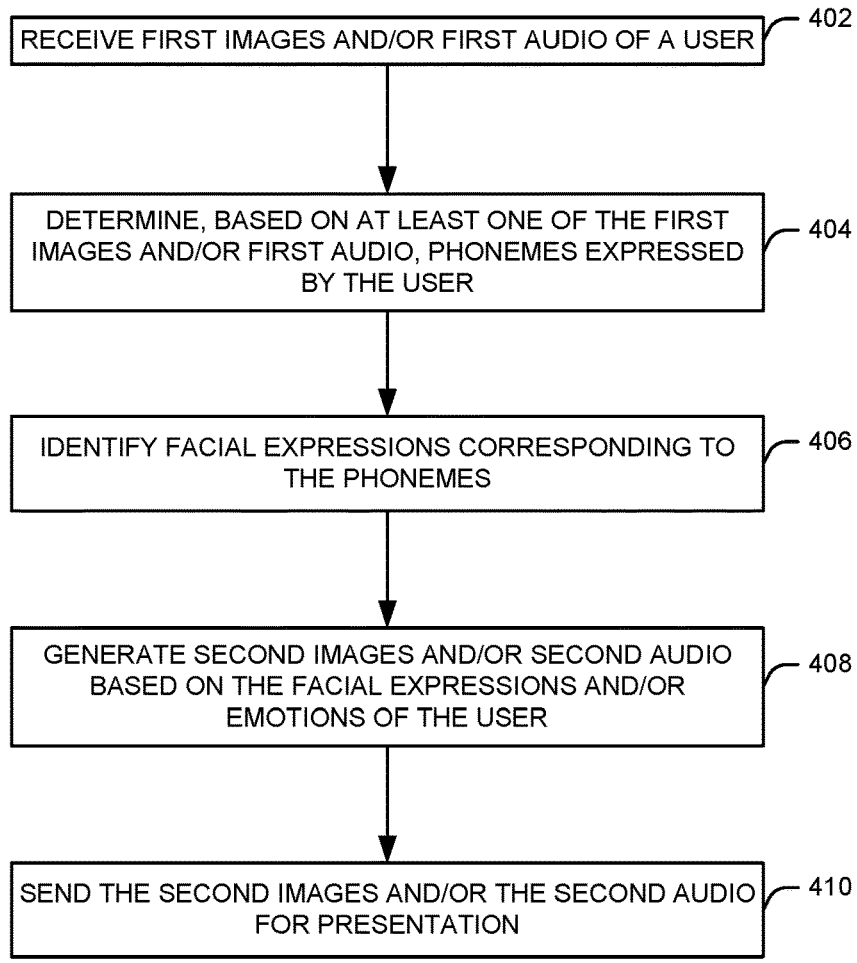
FIG. 4A illustrates a flow diagram for a process for audio and video capture and presentation, in accordance with one or more example embodiments of the present disclosure.

FIG. 4A illustrates a flow diagram for a process 400 for audio and video capture and presentation, in accordance with one or more example embodiments of the present disclosure.

At block 402, a device (e.g., the camera 108 of FIG. 1, the headset 110 of FIG. 1, the facemask 114 of FIG. 1, the camera 208 of FIG. 2, the headset 210 of FIG. 2, the facemask 214 of FIG. 2, the device 302 of FIG. 3, the devices 304 of FIG. 3) may receive first images and/or audio of a user (e.g., the first user 102 of FIG. 1, the first user 202 of FIG. 2). The user may be speaking and/or gesturing (e.g., as shown in FIG. 1 and FIG. 2). The first images may include images of the user speaking and/or performing gestures. The first audio may include captured voice utterances (e.g., the voice utterance 106 of FIG. 1).

At block 404, the device may determine, based on at least one of the first images and/or audio, phonemes expressed by the user (e.g., the first phoneme 130, the second phoneme 132, and/or the third phoneme 134 of FIG. 1). The phonemes may correspond to specific syllables or letters spoken by the user (e.g., detected in the first audio). When the first images show gestures performed by the user, the device may determine that the gestures correspond to words. For example, gestures may include sign language, and the words represented by sign language gestures may, when spoken, include the phonemes. The device may use image analysis to identify gestures in the first images, and determine whether a gestured identified in the first images matches a word (e.g., using images stored in the image storage 328 of FIG. 3). When the gesture matches a word, the device may determine the phonemes in the word, and may identify one or more images of a person (e.g., the user, an avatar of the user, or another person stored in the image storage 328) performing the gesture and/or saying the particular phoneme(s) of the word. The device may identify audio recordings (e.g., in the audio storage 326 of FIG. 3) of a person (e.g., the user, a synthetic voice, or another person's voice) expressing the phonemes. The device may match the first audio to audio recordings of the phonemes, for example.

At block 406, the device may identify facial expressions corresponding to the identified phonemes. For example, the stored images may include images of a person (e.g., the user, an avatar of the user, or another person stored in the image storage 328) saying the phonemes. The images may be tagged or otherwise include an indication of a phoneme that corresponds to the facial expression shown in a respective image.

At block 408, the device may generate second images and/or second audio based on the facial expressions corresponding to the identified phonemes. For example, the second images may include images of the user (e.g., the user, an avatar of the user, or another person stored in the image storage 328) expressing facial expressions that correspond to the identified phonemes and/or images corresponding the user performing gestures of the words that use the identified phonemes. To generate the second audio, the device may identify audio recordings of the user (e.g., audio recordings of the user, a synthetic voice, another person's voice, etc.) pronouncing the identified phonemes, and may aggregate the audio recordings to generate the second audio (e.g., an audio file including the recordings of the phonemes). In this manner, the second images and/or second audio may not represent a mere encoded and/or filtered version of the first images and/or first audio of the user, but rather may represent a recreated representation of the user's voice and/or a synthetic voice pronouncing the phonemes (e.g., that, when aggregated, sound like someone speaking the words that include the phonemes) and/or a recreated video representation of the user (e.g., an avatar of the user) with images (e.g., video frames) showing the user's facial expressions and/or gestures that correspond to the identified phonemes. In one or more embodiments, the device may determine a tone, valence, and/or intensity of captured audio and/or by identifying facial expressions and/or gestures to determine a person's emotion (e.g., excited, happy, sad, angry, etc.). In this manner, when generating representative images and/or audio of a user speaking and/or gesturing, the tone or intensity may be selected to match the identified tone or intensity of captured audio and/or images. In a similar manner, the generated images of the user speaking may use facial expressions and/or gestures that represent the person's tone or intensity (e.g., using more or less pronounced facial expressions and/or gestures, etc.). For example, emotions of a user may be reflected in movements of the user's head, eyes, eyebrows, and mouth. The information transmitted for presentation may include phonemes and/or emotions. The emotions may be transmitted when a connection metric satisfies connection criteria (e.g., a received strength signal indicator), and excluded from transmission when the connection criteria is not satisfied. When the connection criteria is satisfied, a representation of the user's voice may be used for generated audio, but when the connection criteria is not satisfied, a synthetic voice may be used for the generated audio.

At block 410, the device may send the second images and/or second audio to a second device for presentation (e.g., to display 122 of FIG. 1, to display 222 of FIG. 2, to device 304 of FIG. 3). The second images and/or second audio may represent something different than a stream of captured audio/video of the user. Instead, the second images and/or second audio may represent audio and/or video reconstructed using stored/generated images and/or audio that represent the user pronouncing phonemes and/or performing gestures.

Figure 4B:
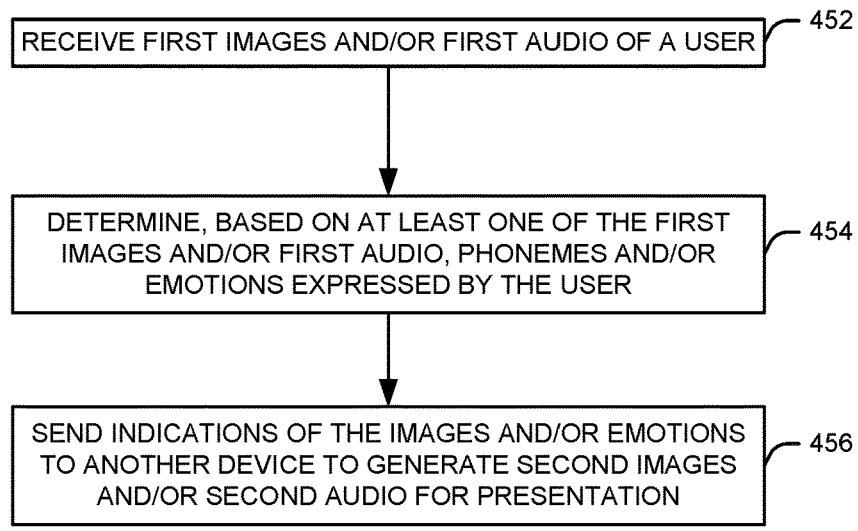
FIG. 4B illustrates a flow diagram for a process for audio and video capture and presentation, in accordance with one or more example embodiments of the present disclosure.

FIG. 4B illustrates a flow diagram for a process 450 for audio and video capture and presentation, in accordance with one or more example embodiments of the present disclosure.

At block 452, a device (e.g., the camera 108 of FIG. 1, the headset 110 of FIG. 1, the facemask 114 of FIG. 1, the camera 208 of FIG. 2, the headset 210 of FIG. 2, the facemask 214 of FIG. 2, the device 302 of FIG. 3, the devices 304 of FIG. 3) may receive first images and/or audio of a user (e.g., the first user 102 of FIG. 1, the first user 202 of FIG. 2). The user may be speaking and/or gesturing (e.g., as shown in FIG. 1 and FIG. 2). The first images may include images of the user speaking and/or performing gestures. The first audio may include captured voice utterances (e.g., the voice utterance 106 of FIG. 1).

At block 454, the device may determine, based on at least one of the first images and/or audio, phonemes expressed by the user (e.g., the first phoneme 130, the second phoneme 132, and/or the third phoneme 134 of FIG. 1). The phonemes may correspond to specific syllables or letters spoken by the user (e.g., detected in the first audio). When the first images show gestures performed by the user, the device may determine that the gestures correspond to words. For example, gestures may include sign language, and the words represented by sign language gestures may, when spoken, include the phonemes. The device may use image analysis to identify gestures in the first images, and determine whether a gestured identified in the first images matches a word (e.g., using images stored in the image storage 328 of FIG. 3). When the gesture matches a word, the device may determine the phonemes in the word, and may identify one or more images of a person (e.g., the user, an avatar of the user, or another person stored in the image storage 328) performing the gesture and/or saying the particular phoneme(s) of the word. The device may identify audio recordings (e.g., in the audio storage 326 of FIG. 3) of a person (e.g., the user, a synthetic voice, or another person's voice) expressing the phonemes. The device may match the first audio to audio recordings of the phonemes, for example. The device may determine emotions based on any combination of images and/or audio. For example, the device may determine a tone, valence, and/or intensity of captured audio and/or by identifying facial expressions and/or gestures to determine a person's emotion (e.g., excited, happy, sad, angry, etc.). In this manner, when generating representative images and/or audio of a user speaking and/or gesturing, the tone or intensity may be selected to match the identified tone or intensity of captured audio and/or images. In a similar manner, the generated images of the user speaking may use facial expressions and/or gestures that represent the person's tone or intensity (e.g., using more or less pronounced facial expressions and/or gestures, etc.). For example, emotions of a user may be reflected in movements of the user's head, eyes, eyebrows, and mouth. The information transmitted for presentation may include phonemes and/or emotions. The emotions may be transmitted when a connection metric satisfies connection criteria (e.g., a received strength signal indicator), and excluded from transmission when the connection criteria is not satisfied. When the connection criteria is satisfied, a representation of the user's voice may be used for generated audio, but when the connection criteria is not satisfied, a synthetic voice may be used for the generated audio.

At block 456, the device may send, to a second device, indications of the phonemes and/or emotions identified based on the images and/or audio. The second device may generate second images and/or audio (e.g., as described for block 408 of FIG. 4A) to present rather than the device generating and sending the second images and/or audio. In this manner, bandwidth and other resources may be conserved by transmitting the phonemes and/or emotions as data to be used to generate the second images and/or audio for presentation.

Figure 5:
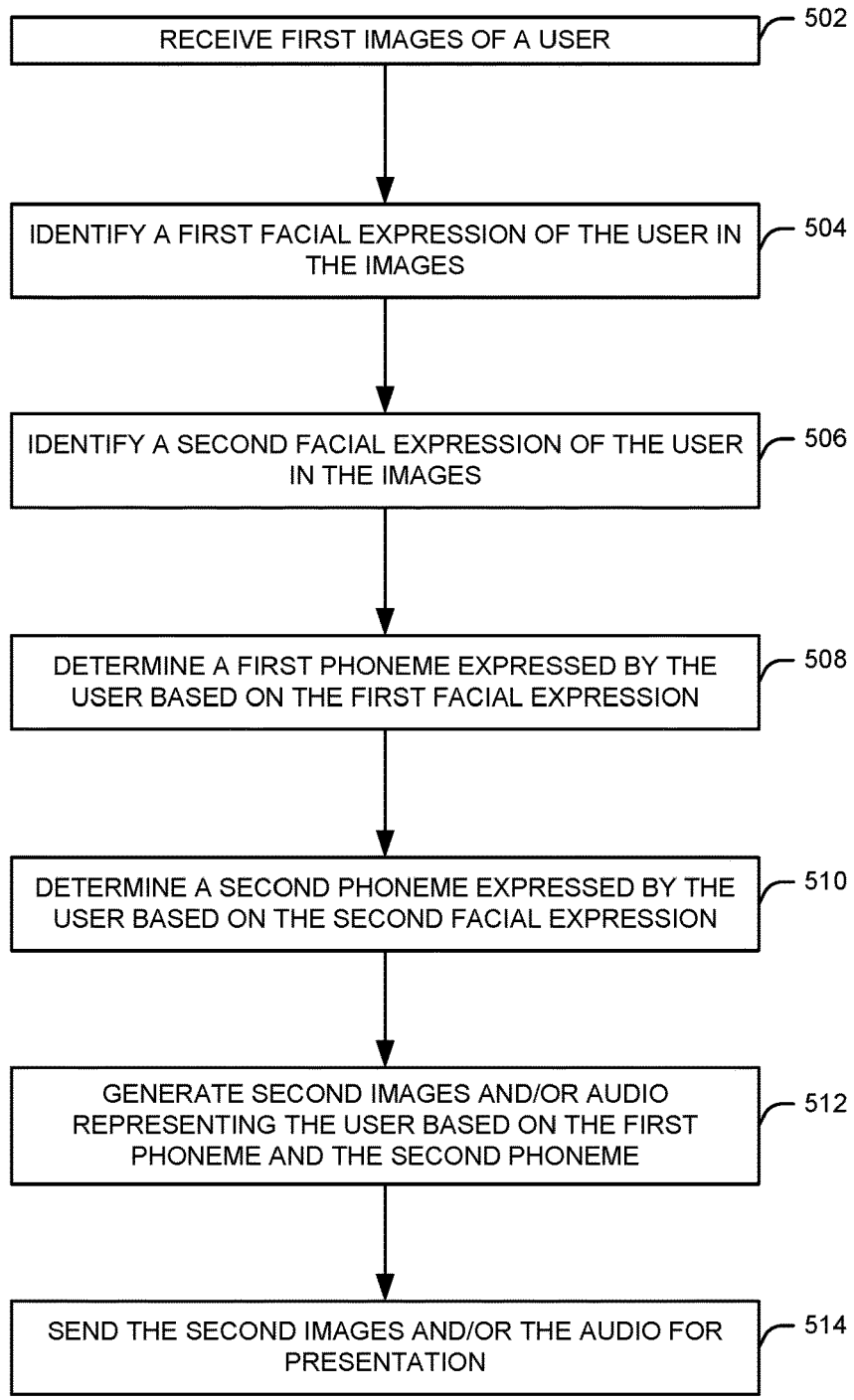
FIG. 5 illustrates a flow diagram for a process for audio and video capture and presentation, in accordance with one or more example embodiments of the present disclosure.

FIG. 5 illustrates a flow diagram for a process 500 for audio and video capture and presentation, in accordance with one or more example embodiments of the present disclosure.

At block 502, a device (e.g., the camera 108 of FIG. 1, the headset 110 of FIG. 1, the facemask 114 of FIG. 1, the camera 208 of FIG. 2, the headset 210 of FIG. 2, the facemask 214 of FIG. 2, the device 302 of FIG. 3, the devices 304 of FIG. 3) may receive first images of a user (e.g., the first user 102 of FIG. 1, the first user 202 of FIG. 2). The user may be speaking and/or gesturing (e.g., as shown in FIG. 1 and FIG. 2). The first images may include images of the user speaking and/or performing gestures.

At block 504, the device may identify a first facial expression of the user in the images (e.g., in a first image of the images). At block 506, the device may identify a second facial expression of the user in the images (e.g., in a second image of the images). For example, the device may use image analysis techniques to determine whether image data represents a facial expression that corresponds to a known facial expression that a person expresses when pronouncing a phoneme (e.g., using matching images in the image storage 328 of FIG. 3). The device may ignore facial expressions in the first images that do not match known phoneme facial expressions, or may include those facial expressions in generated second images.

At block 508, the device may determine a first phoneme expressed by the user based on the first facial expression. At block 510, the device may determine a second phoneme expressed by the user based on the second facial expression. The phonemes may correspond to specific syllables or letters spoken by the user. Stored images may have tags or other indications that identify phonemes represented by facial expressions shown in the stored images.

At block 512, the device may generate second images and/or audio based on the facial expressions corresponding to the identified phonemes. For example, the second images may include images of the user (e.g., the user, an avatar of the user, or another person stored in the image storage 328) expressing facial expressions that correspond to the identified phonemes and/or images corresponding the user performing gestures of the words that use the identified phonemes. To generate the audio, the device may identify audio recordings of the user (e.g., audio recordings of the user, a synthetic voice, another person's voice, etc.) pronouncing the identified phonemes, and may aggregate the audio recordings to generate the audio (e.g., an audio file including the recordings of the phonemes). In this manner, the second images and/or audio may not represent a mere encoded and/or filtered version of the first images and/or first audio of the user, but rather may represent a recreated representation of the user's voice and/or a synthetic voice pronouncing the phonemes (e.g., that, when aggregated, sound like someone speaking the words that include the phonemes) and/or a recreated video representation of the user (e.g., an avatar of the user) with images (e.g., video frames) showing the user's facial expressions and/or gestures that correspond to the identified phonemes.

At block 514, the device may send the second images and/or audio to a second device for presentation (e.g., to display 122 of FIG. 1, to display 222 of FIG. 2, to device 304 of FIG. 3). The second images and/or audio may represent something different than a stream of captured audio/video of the user. Instead, the second images and/or audio may represent audio and/or video reconstructed using stored/generated images and/or audio that represent the user pronouncing phonemes and/or performing gestures.

Figure 6:
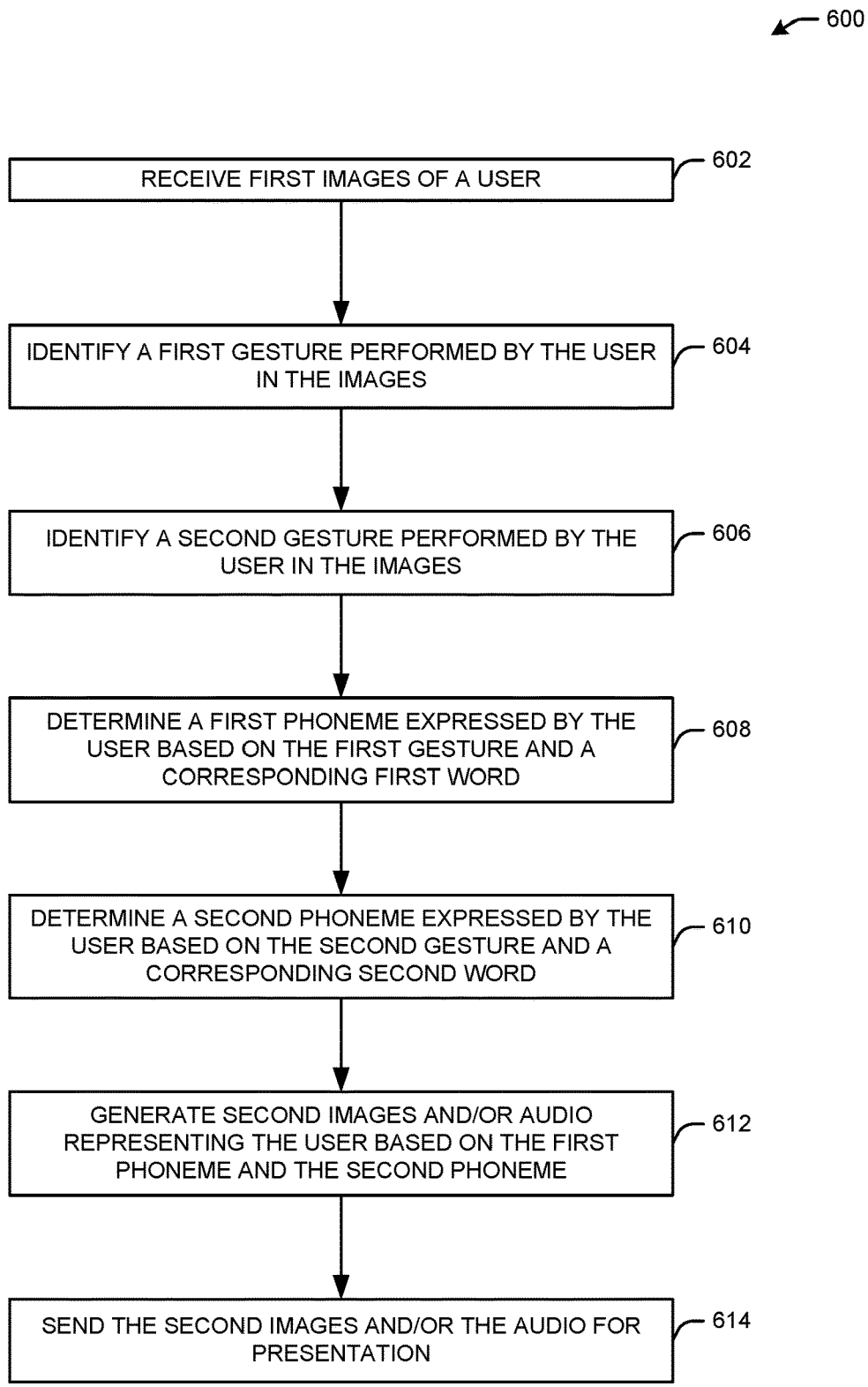
FIG. 6 illustrates a flow diagram for a process for audio and video capture and presentation, in accordance with one or more example embodiments of the present disclosure.

FIG. 6 illustrates a flow diagram for a process 600 for audio and video capture and presentation, in accordance with one or more example embodiments of the present disclosure.

At block 602, a device (e.g., the camera 108 of FIG. 1, the headset 110 of FIG. 1, the facemask 114 of FIG. 1, the camera 208 of FIG. 2, the headset 210 of FIG. 2, the facemask 214 of FIG. 2, the device 302 of FIG. 3, the devices 304 of FIG. 3) may receive first images of a user (e.g., the first user 102 of FIG. 1, the first user 202 of FIG. 2). The user may be speaking and/or gesturing (e.g., as shown in FIG. 1 and FIG. 2). The first images may include images of the user speaking and/or performing gestures.

At block 604, the device may identify a first gesture performed by the user in the images (e.g., in a first image of the images). At block 606, the device may identify a second gesture performed by the user in the images (e.g., in a second image of the images). For example, the device may use image analysis techniques to determine whether image data represents a sign language gesture with a corresponding word (e.g., using matching images in the image storage 328 of FIG. 3). The device may ignore gestures in the first images that do not match known sign language gestures corresponding to words, or may include those gestures in generated second images.

At block 608, the device may determine a first phoneme expressed by the user based on the first gesture and a corresponding first word represented by the first gesture. At block 610, the device may determine a second phoneme expressed by the user based on the second gesture and a corresponding second word represented by the second gesture. When the gestures correspond to words, the device may determine the phonemes of the words when the words are spoken by a person.

At block 612, the device may generate second images and/or audio based on the first and second phonemes. For example, the phonemes may be represented with image data, including images of the user (e.g., the user, an avatar of the user, or another person stored in the image storage 328) expressing facial expressions that correspond to the identified phonemes and/or images corresponding the user performing gestures of the words that use the identified phonemes. To generate the audio, the device may identify audio recordings of the user (e.g., audio recordings of the user, a synthetic voice, another person's voice, etc.) pronouncing the identified phonemes, and may aggregate the audio recordings to generate the audio (e.g., an audio file including the recordings of the phonemes). In this manner, the second images and/or audio may not represent a mere encoded and/or filtered version of the first images and/or first audio of the user, but rather may represent a recreated representation of the user's voice and/or a synthetic voice pronouncing the phonemes (e.g., that, when aggregated, sound like someone speaking the words that include the phonemes) and/or a recreated video representation of the user (e.g., an avatar of the user) with images (e.g., video frames) showing the user's facial expressions and/or gestures that correspond to the identified phonemes.

At block 614, the device may send the second images and/or audio to a second device for presentation (e.g., to display 122 of FIG. 1, to display 222 of FIG. 2, to device 304 of FIG. 3). The second images and/or audio may represent something different than a stream of captured audio/video of the user. Instead, the second images and/or audio may represent audio and/or video reconstructed using stored/generated images and/or audio that represent the user pronouncing phonemes and/or performing gestures.

Figure 7:
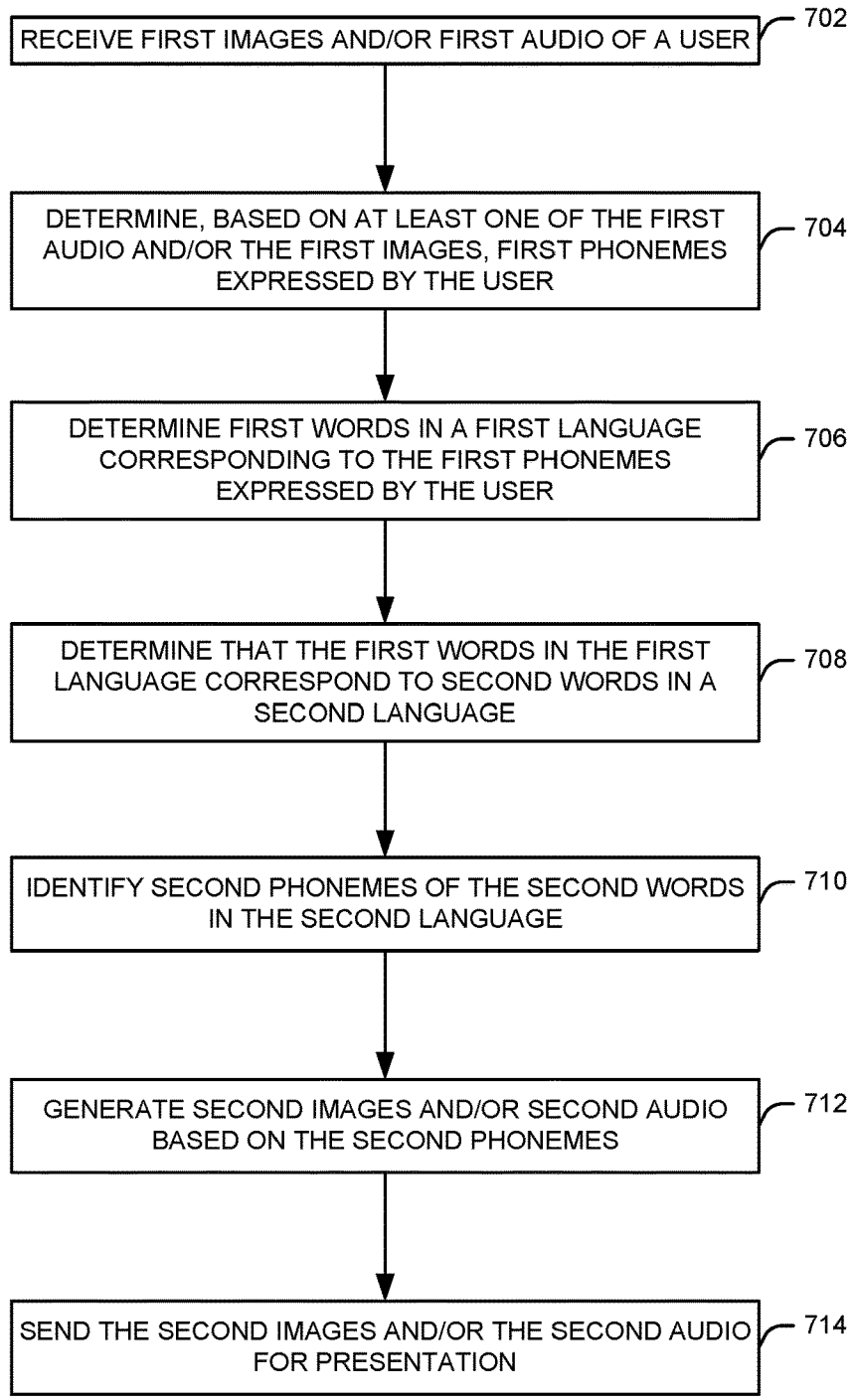
FIG. 7 illustrates a flow diagram for a process for audio and video capture and presentation, in accordance with one or more example embodiments of the present disclosure.

FIG. 7 illustrates a flow diagram for a process 700 for audio and video capture and presentation, in accordance with one or more example embodiments of the present disclosure.

At block 702, a device (e.g., the camera 108 of FIG. 1, the headset 110 of FIG. 1, the facemask 114 of FIG. 1, the camera 208 of FIG. 2, the headset 210 of FIG. 2, the facemask 214 of FIG. 2, the device 302 of FIG. 3, the devices 304 of FIG. 3) may receive first images and/or audio of a user (e.g., the first user 102 of FIG. 1, the first user 202 of FIG. 2). The user may be speaking and/or gesturing (e.g., as shown in FIG. 1 and FIG. 2). The first images may include images of the user speaking and/or performing gestures. The first audio may include captured voice utterances (e.g., the voice utterance 106 of FIG. 1).

At block 704, the device may determine, based on at least one of the first images and/or audio, first phonemes expressed by the user (e.g., the first phoneme 130, the second phoneme 132, and/or the third phoneme 134 of FIG. 1). At block 706, the device may determine first words in the first language that include the first phonemes. The first phonemes may correspond to specific syllables or letters spoken by the user (e.g., detected in the first audio) in a first language. When the first images show gestures performed by the user, the device may determine that the gestures correspond to words in the first language. For example, gestures may include sign language, and the words represented by sign language gestures may, when spoken, include the phonemes. The device may use image analysis to identify gestures in the first images, and determine whether a gestured identified in the first images matches a word in the first language (e.g., using images stored in the image storage 328 of FIG. 3). When the gesture matches a word, the device may determine the phonemes in the word, and may identify one or more images of a person (e.g., the user, an avatar of the user, or another person stored in the image storage 328) performing the gesture and/or saying the particular phoneme (s) of the word. The device may identify audio recordings (e.g., in the audio storage 326 of FIG. 3) of a person (e.g., the user, a synthetic voice, or another person's voice) expressing the phonemes. The device may match the first audio to audio recordings of the phonemes, for example, in the first language.

At block 708, the device may determine that the first words in the first language correspond to second words in a second language. The second language may be selected based on a user preference, a user's location, or the like. The device may use natural language processing and translation to translate the first words in the first language to second words in the second language, allowing for generation of audio and/or images that correspond to the second language even when the user's voice and/or gestures are in the first language. In particular, the device may identify from images and/or audio the words that a person is speaking and/or gesturing. Using natural language processing, the device may covert the words to text in one language and translate the text into one or more other languages (e.g., by converting multiple words or sentences at a time). The device may convert the translated text to phonemes to be used when generating representative images and/or audio of a person communicating the phonemes in any translated language.

At block 710, the device may identify second phonemes of the second words in the second language. The phonemes of the words in the first language may be different than the phonemes of the first words in the first language, and therefore may correspond to different audio sounds and/or images representing the user speaking the phonemes. At block 712, the device may generate second images and/or second audio based on the facial expressions corresponding to the identified phonemes. For example, the second images may include images of the user (e.g., the user, an avatar of the user, or another person stored in the image storage 328) expressing facial expressions that correspond to the identified phonemes and/or images corresponding the user performing gestures of the words that use the identified phonemes. To generate the second audio, the device may identify audio recordings of the user (e.g., audio recordings of the user, a synthetic voice, another person's voice, etc.) pronouncing the identified phonemes in the second language, and may aggregate the audio recordings to generate the second audio (e.g., an audio file including the recordings of the phonemes in the second language). In this manner, the second images and/or second audio may not represent a mere encoded and/or filtered version of the first images and/or first audio of the user, but rather may represent a recreated representation of the user's voice and/or a synthetic voice pronouncing the phonemes (e.g., that, when aggregated, sound like someone speaking the words that include the phonemes) in a different language than the user may have spoken them, and/or a recreated video representation of the user (e.g., an avatar of the user) with images (e.g., video frames) showing the user's facial expressions and/or gestures that correspond to the identified phonemes in the second language. For example, the user may have spoken in English, but the second audio may represent a Chinese translation, and the second images may represent the facial expressions that the user may express if the user were to pronounce the first words as the second words in the second language.

At block 710, the device may send the second images and/or second audio to a second device for presentation (e.g., to display 122 of FIG. 1, to display 222 of FIG. 2, to device 304 of FIG. 3). The second images and/or second audio may represent something different than a stream of captured audio/video of the user. Instead, the second images and/or second audio may represent audio and/or video reconstructed using stored/generated images and/or audio that represent the user pronouncing phonemes and/or performing gestures. In this manner, no matter which language the user uses, other users may be presented with corresponding images and/or audio that represent the user in any language, even a language different than the language used by the user to generate the first images and/or audio at block 702.

These examples are not meant to be limiting.

Figure 8:
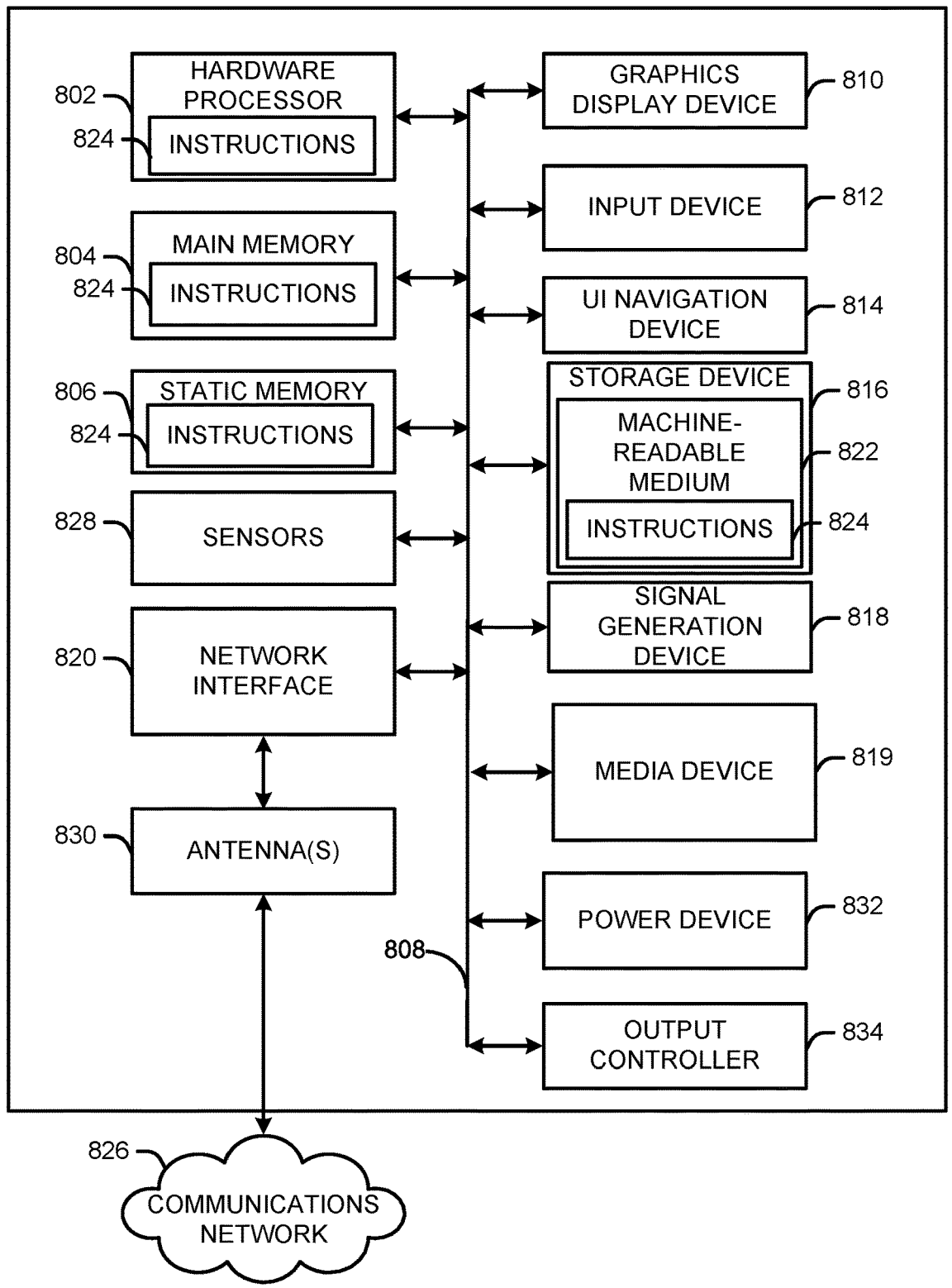
FIG. 8 illustrates a block diagram of an example machine upon which any of one or more techniques (e.g., methods) may be performed, in accordance with one or more example embodiments of the present disclosure.

FIG. 8 illustrates a block diagram of an example of a machine 800 or system (e.g., the camera 108 of FIG. 1, the headset 110 of FIG. 1, the facemask 114 of FIG. 1, the camera 208 of FIG. 2, the headset 210 of FIG. 2, the facemask 214 of FIG. 2, the device 302 of FIG. 3, the devices 304 of FIG. 3) or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in Wi-Fi direct, peer-to-peer (P2P), cellular, (or other distributed) network environments. The machine 800 may be a server, a personal computer (PC), a smart home device, a tablet PC, a personal digital assistant (PDA), a mobile telephone, a wearable computer device, a web appliance, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818, a media device 819 (e.g., capable of performing the process 400 of FIG. 4, the process 500 of FIG. 5, the process 600 of FIG. 6, and/or the process 700 of FIG. 7 using ML techniques), a network interface device/transceiver 820 coupled to antenna(s) 830, and one or more sensors 828, such as a microphone, a camera, a global positioning system (GPS) sensor, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 816 may include a machine readable medium 822 on which is stored one or more sets of data structures or instructions (e.g., software) embodying or utilized by any one or more of the techniques or functions described herein. The instructions may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for interpreting user communications, the method comprising:
    receiving, by at least one processor of a first device, first images of a user during a time period;
    receiving, by the at least one processor, first audio of the user during the time period;
    determining, by the at least one processor, based on a noise level of the first audio, that phonemes communicated by the user during the time period are identified based on the images;

determining, by the at least one processor, based on a first image of the images, a first phoneme expressed by the user;

determining, by the at least one processor, based on a second image of the images, a second phoneme expressed by the user;

identifying, by the at least one processor, based on the first phoneme, a first facial expression;

identifying, by the at least one processor, based on the second phoneme, a second facial expression;

generating, by the at least one processor, second audio comprising the first phoneme and the second phoneme;

generating, by the at least one processor, second images comprising a first representation of the user expressing the first facial expression and a second representation of the user expressing the second facial expression;

sending, by the at least one processor, the second audio to a second device for presentation; and sending, by the at least one processor, the second images to the second device for concurrent presentation with the second audio.

2. The method of claim 1, further comprising identifying, based on first image data of the first image, a first facial expression of the user in a first image of the first images; and identifying, based on second image data of the second image, a second facial expression of the user in a second image of the first images, wherein determining the first phoneme expressed by the user is based on the identification of the first facial expression from the first image data, and wherein determining the second phoneme expressed by the user is based on the identification of the second facial expression from the second image data.

3. The method of claim 1, further comprising:

identifying a first gesture performed by the user in a first image of the first images;

identifying a second gesture performed by the user in a second image of the first images;

determining a first word associated with the first gesture; and determining a second word associated with the second gesture, wherein determining the first phoneme expressed by the user is based on the identification of the first gesture, and wherein determining the second phoneme expressed by the user is based on the identification of the second gesture.

4. The method of claim 1, further comprising:

receiving, at a first time, a first image representing the user, wherein the first images are received at a second time after the first time, wherein generating the second images is based on the first image, the first facial expression, and the second facial expression.

5. The method of claim 1, further comprising:

receiving, at a first time, third audio representing the user, wherein the first images are received at a second time after the first time, wherein generating the second audio is based on the third audio, the first phoneme, and the second phoneme.

6. A method for interpreting user communications, the method comprising:

receiving, by at least one processor of a first device, images of a user during a time period;

receiving, by the at least one processor, audio of the user during the time period;

identifying, by the at least one processor, in a first image of the images, a first expression of the user;

identifying, by the at least one processor, in a second image of the images, a second expression of the user;

determining, by the at least one processor, based on a noise level of the audio, that phonemes communicated by the user during the time period are identified based on the images;

determining, by the at least one processor, that the first expression is associated with a first phoneme;

determining, by the at least one processor, that the second expression is associated with a second phoneme; and sending, by the at least one processor, an indication of the first phoneme and the second phoneme to a second device.

7. The method of claim 6, wherein the first expression of the user is a first facial expression of the user and the second expression of the user is a second facial expression of the user.

8. The method of claim 6, wherein the first expression of the user is a first gesture and the second expression of the user is a second gesture, the method further comprising:

determining a first word associated with the first gesture; and determining a second word associated with the second gesture, wherein determining that the first expression is associated with the first phoneme is based on the identification of the first gesture, and wherein determining that the second expression is associated with the second phoneme is based on the identification of the second gesture.

9. The method of claim 6, further comprising:

receiving, at a first time, a first image representing the user, wherein the images are first images received at a second time after the first time; and generating, based on the first image, the first expression, and the second expression, second images comprising a first representation of the user expressing the first expression and a second representation of the user expressing the second expression, wherein sending the indication of the first phoneme and the second phoneme comprises sending the second images to the second device for presentation.

10. The method of claim 9, wherein the first representation and the second representation are based on an avatar of the user.

11. The method of claim 6, further comprising:

receiving, at a first time, first audio representing the user, wherein the images are received at a second time after the first time; and generating second audio based on the first audio, the first phoneme, and the second phoneme, wherein sending the indication of the first phoneme and the second phoneme comprises sending the second audio to the second device for presentation.

12. The method of claim 6, further comprising:

generating second audio based on the first audio and the first images, wherein sending the indication of the first phoneme and the second phoneme comprises sending the second audio to the second device for presentation.

13. The method of claim 12, wherein the second audio comprises a synthetic voice.

14. The method of claim 6, wherein determining that the first expression is associated with the first phoneme and determining that the second expression is associated with the second phoneme are based on machine learning comprising a deep neural network.

15. The method of claim 6, further comprising:
determining, based on at least one of the images or the audio, an emotion of the user; and
generating second audio based on the emotion,
wherein sending the indication of the first phoneme and the second phoneme comprises sending the second audio to the second device for presentation.

16. The method of claim 6, further comprising:
determining, based on at least one of the images or the audio, an emotion of the user,
wherein sending the indication of the first phoneme and the second phoneme comprises sending an indication of the emotion to the second device.

17. The method of claim 6, further comprising:
identifying, in a third image of the images, a third expression of the user;
determining an absence of a third phoneme associated with the third expression;
generating second images comprising a representation of the user expressing the third expression; and
sending the second images to the second device for presentation.

18. The method of claim 6, further comprising:
identifying, based on the audio, first words in a first language;
generating first text comprising the first words in the first language;
determining that the first words in the first language translate to second words in a second language;
generating second text comprising the second words in the second language;
determining, based on the second words in the second language; a third phoneme;
generating third audio comprising the third phoneme; and
sending the third audio to a third device for presentation.

19. A system comprising memory coupled to at least one processor, the at least one processor configured to:
receive images of user during a time period;
receive audio of the user during the time period;
identify, in a first image of the images, a first expression of the user;
identify, in a second image of the images, a second expression of the user;
determine, based on a noise level of the audio, that phonemes communicated by the user during the time period are identified based on the images;
determine that the first expression is associated with a first phoneme;
determine that the second expression is associated with a second phoneme; and
send an indication of the first phoneme and the second phoneme to a second device for presentation.

20. The system of claim 19, wherein the at least one processor is configured to:
determine a user preference associated with an environment of the user;
generate, based on the user preference, the first expression, and the second expression second images comprising a first representation of the user expressing the first expression and a second representation of the user expressing the second expression; and
send the second images to the second device for concurrent presentation with the audio.

* * * * *